Patented Nov. 11, 1952

2,617,800

UNITED STATES PATENT OFFICE 2,617,800

PURIFICATION OF CARBOXYMETHYL CELLULOSE BY ION EXCHANGE RESINS

William E. Bergman, Bartlesville, Okla., assignor to Phillips Petroleum Company, a corporation of Delaware No Drawing. Application June 10, 1949, Serial No. 98,387

4 Claims. (Cl. 260—232)

This invention relates to carboxymethylcellulose solutions. More specifically, it relates to a method of preparing water soluble acid carboxymethylcellulose from the water soluble salts thereof. In another specific aspect, it relates to a method of removing impurities from carboxymethylcellulose solutions. In still another specific aspect, it relates to a film-forming solution of acid carboxymethylcellulose.

Carboxymethylcellulose, sometimes called cellulose glycolic acid, is generally prepared as the sodium salt by the reaction of alkali cellulose with monochloracetic acid. This reaction gives the sodium salt, which is soluble in water. It is ordinarily recovered by precipitation from the water solution by the addition of methyl alcohol. The acid carboxymethylcellulose has been prepared by treatment with nitric acid in the presence of methyl alcohol. The literature on this subject teaches that acid carboxymethylcellulose is insoluble in water and in methyl alcohol. I have discovered a new method for converting the water soluble metal salts of carboxymethylcellulose into the acid and also removing the undesirable reaction products or other impurities. The purified product is completely soluble in water and is soluble in methyl alcohol up to concentrations of 90 per cent. In this method, I use cation exchange resin to convert the carboxymethylcellulose salt to the acid and at the same time convert other materials, such as inorganic salts, which are present as impurities, to the acid of the respective anions. I can then remove the inorganic acids and low molecular weight organic acids by treatment with an anion exchange resin.

The principal object of my invention is to provide a method of preparing acid carboxymethylcellulose.

Another object is to provide a method of converting water soluble metal salts of carboxymethylcellulose to the acid.

Another object is to provide a method of removing undesirable impurities from carboxymethylcellulose solutions.

Another object is to provide a method of preparing a water soluble acid carboxymethylcellulose.

Still another object is to provide a method of preparing a film-forming solution of carboxymethylcellulose.

Other objects and advantages of my invention will be obvious from the following discussion.

In preparing carboxymethylcellulose, the usual method gives the sodium salt and sodium chloride, sodium glycolate and small amount of other electrolytes as impurities. These products are water soluble, but the addition of methyl alcohol to the water solution will precipitate the sodium carboxymethylcellulose. However, it is impossible to remove all of the sodium chloride and other impurities by this precipitation method. A sufficient amount of the soluble impurities remain, either occluded or adsorbed, so that on the addition of methyl alcohol to a water solution, there is a salting-out effect which helps to effect the precipitation of the carboxymethylcellulose salt.

By practicing my invention, I am able to prepare an acid carboxymethylcellulose which is free from inorganic and other low molecular weight impurities. The resulting product is soluble in water and soluble in methyl alcohol solutions. By making a solution of the acid carboxymethylcellulose in water and methyl alcohol, the solution can be sprayed on surfaces to form a fast-drying film which, on being dried at 105° C., becomes impervious to water and will not redissolve. This probably results from lactone formation between the carboxyl groups and adjacent hydroxyl groups.

When reference is made to "90 per cent methyl alcohol," it is to be understood that a water-alcohol mixture consisting of 90 per cent methyl alcohol and 10 per cent water is meant. The term "alcohol solutions" means solutions wherein the solvent is alcohol and water.

In preparing the purified acid carboxymethylcellulose, I prefer to begin with the sodium salt, which is available as an article of commerce. However, I can use any of the other water soluble salts of carboxymethylcellulose. The material obtained commercially contains other impurities such as inorganic salts and low molecular weight organic materials. As the first step, I intimately contact the water soluble solution with an acid-regenerated cation exchange material. This results in the exchange of sodium and other cations present in the solution for hydrogen ions. A convenient method of carrying this out is to provide a bed of the cation exchanger and filter the water solution therethrough.

As cation exchangers, I prefer to use the water insoluble, inorganic, resinous materials which are generally of the phenol-formaldehyde type. In most of these, the active portion of the molecule is a carboxylic group or a sulfonic acid group. Examples of these are Amberlite IRC–50, and Amberlite IR–120, which are sold by Resinous Products & Chemical Company. The first of these is a carboxyl type and the second is a sulfonic acid type. Other cation exchangers can be substituted for these. Examples are the natural and synthetic zeolites, and sulfonated coals or other organic materials.

These cation exchange resins must be acid-regenerated before contacting with the carboxymethylcellulose solution. When the solution is contacted with the acid-regenerated resin, the cations of the solution are replaced by hydrogen ions.

The next step is to pass the effluent from the first step through a bed of anion exchange material. These are sometimes referred to as acid adsorbents because it is generally believed that these materials remove the acid by adsorbing the entire molecule. However, it is possible that an ion exchange occurs whereby the acid anion is adsorbed by the resin and a hydroxyl group or carbonic acid anion is released to the solution. Whatever the mechanism is, the effect is to remove the anions of the impurities, since the material is in water solution. Exhaustion of the acid adsorbing capacity of the anion exchange resin is indicated by a rise in the pH of the effluent. I have found that Amberlite IRA-400, which is a phenol-formaldehyde derivative having an amine group as the active portion of the molecule, is effective. Amberlite IR-4B is another good one.

The ion exchange resins are ordinarily rated according to their exchange capacity. In determining the amount of resin to be used in each step, it is desirable to know the degree of substitution of the cellulose molecule. The amount of cation exchanger to be used in the first step should have sufficient exchange capacity to react with all of the carboxyl groups present in the carboxymethylcellulose and with the cations present as impurities. I prefer to use from 10 to 20 per cent excess in order to assure complete conversion to the acid carboxymethylcellulose. For best results, I prefer to pass the solution through the resin at a rate not exceeding one volume of solution per volume of ion exchange resin per minute. This gives sufficient time for complete exchange. If the solution is run through faster, the product may still be acceptable, but I prefer to obtain the maximum conversion to the acid. Running the solution through the resin more slowly does not have any detrimental effect, but is not ordinarily necessary.

If the degree of substitution and the approximate amount of impurities are not known, the conversion may be carried out by determining the pH of the effluent as it flows from the contact bed. As long as the cation exchange resin is active and conversion is occurring, the pH of the effluent will be constant. When the pH of the effluent rises suddenly, it indicates that the exchange capacity of the resin has been used up and conversion is no longer occurring. Exhaustion of the exchange capacity in this next step is indicated by a drop in the pH value of the effluent.

For regenerating the cation exchange resin, I can use any strong acid that does not form a precipitate with the cations being replaced. I prefer to use hydrochloric, since it does not form insoluble compounds with any of the impurities likely to be present in the solution.

It is not necessary that the carboxymethylcellulose solution be passed through a bed of resin, as previously described. The resin may be dispersed in the solution and separation made by decantation. Another method is to mix the two ion exchange resins and make the conversion with one contact. However, I prefer the two-bed method since it permits closer control.

Aqueous solutions of the ion-exchange-prepared acid carboxymethylcellulose are free from visible turbidity which is usually characteristic of the solutions of the crude sodium salt. These solutions are probably at least partially of a collodial nature. When viewed in the dark with a beam of light they exhibit a pronounced Tyndall effect. Freezing the aqueous suspensions does not coagulate the material. The acids are not precipitated from aqueous solutions by the addition of methyl alcohol unless salt is added. Sodium carboxymethylcellulose prepared by neutralizing the acid with alkali to the phenolphthalein end point are not precipitated unless salt is added.

The degree of substitution for carboxymethylcellulose is the average number of carboxylic groups per anhydro-glucose unit. For complete substitution, the degree of substitution is 3. I prefer to use a material which has a degree of substitution such that the sodium salt is water soluble or water-dispersible. This is ordinarily above about 0.3.

Solutions of my purified carboxymethylcellulose in alcohol and water are fast drying and the film formed thereby, when completely dry, is not redispersible in water. This offers considerable possibilities as a water-impervious protective film. The ingredients for such a solution are easily obtained and the cost is comparatively low.

Other ion exchange resins, besides those specifically named may also be used in carrying out my invention. My invention is not limited by the specific material listed but is limited only by the following claims.

I claim

1. A method of converting a water-soluble salt of carboxymethylcellulose ether into water soluble acid carboxymethylcellulose ether which comprises intimately contacting an aqueous solution of said salt with an acid-regenerated cation-exchange resin, separating the treated solution from the resin, intimately contacting said treated solution with an anion exchange resin to remove the anions of acidic impurities present and separating said solution which now contains pure acid carboxymethylcellulose ether from said anion exchange material, thus recovering pure water-soluble acid carboxymethylcellulose ether.

2. A method of preparing water soluble acid carboxymethylcellulose ether which comprises establishing intimate contact between an aqueous solution of a water soluble salt of carboxymethylcellulose ether with a hydrogen-exchange material to replace metal cations with hydrogen ions, removing the hydrogen exchange material from contact with said aqueous solution, establishing intimate contact between the treated liquid and an anionic-exchange material to adsorb the anions of acidic impurities present and separating the solution which now contains pure acid carboxymethylcellulose ether therefrom, thus recovering pure water-soluble acid carboxymethylcellulose ether.

3. A method of preparing acid carboxymethylcellulose ether which is soluble in 90% methyl alcohol which comprises the steps of subjecting an aqueous solution of a water soluble salt of carboxymethylcellulose ether to intimate contact with a hydrochloric-acid regenerated cation exchange resin, said contact being maintained for a sufficient time to remove the metal ions from the solution, separating the solution from the ion exchange material, subjecting the liquid to intimate contact with an acid adsorbent ion exchange material for a time sufficient to adsorb the anions of free acid contaminants and separating the solution which now contains pure acid carboxymethylcellulose ether and ion exchange material, thus recovering pure water-soluble acid carboxymethylcellulose ether.

4. The method of preparing acid carboxymethylcellulose ether from a water soluble salt thereof which comprises the steps of passing a water solution of said salt through a first bed of ion exchange material comprising a cation exchange material in an amount sufficient to effect replacement of the exchangeable cations, the rate of flow through said material being such that the contact time with said cation exchange material is at least one minute, and then passing the effluent from the cation exchange contact through a second bed of ion exchange material comprising an acid adsorbent material in an amount at least sufficient to adsorb the anions of inorganic acids present, the rate of flow of said solution through said acid adsorbent being such that the contact time is at least one minute, and recovering said solution now containing free, pure acid carboxymethylcellulose from said acid adsorbent material.

WILLIAM E. BERGMAN.

REFERENCES CITED

The following references are of record in the file of this patent:

UNITED STATES PATENTS

| Number | Name | Date |
| --- | --- | --- |
| 2,244,295 | Heath et al. | June 3, 1941 |
| 2,482,862 | Myers | Sept. 27, 1949 |

OTHER REFERENCES

"Amberlites," a series of bulletins published by Rohm and Haas Company. Bulletin titled Amberlite IR-100, page 1.

Brown et al.: "Society of Chemical Industry Journal," October 1941, pages 254-255.

"Sodium Carboxymethylcellulose," Hercules (1944), pages 2 and 3, Hercules Powder Company.

Myers et al.: Industrial Engineering Chemistry, vol. 33, #6, pages 697 to 706.